Aug. 1, 1961

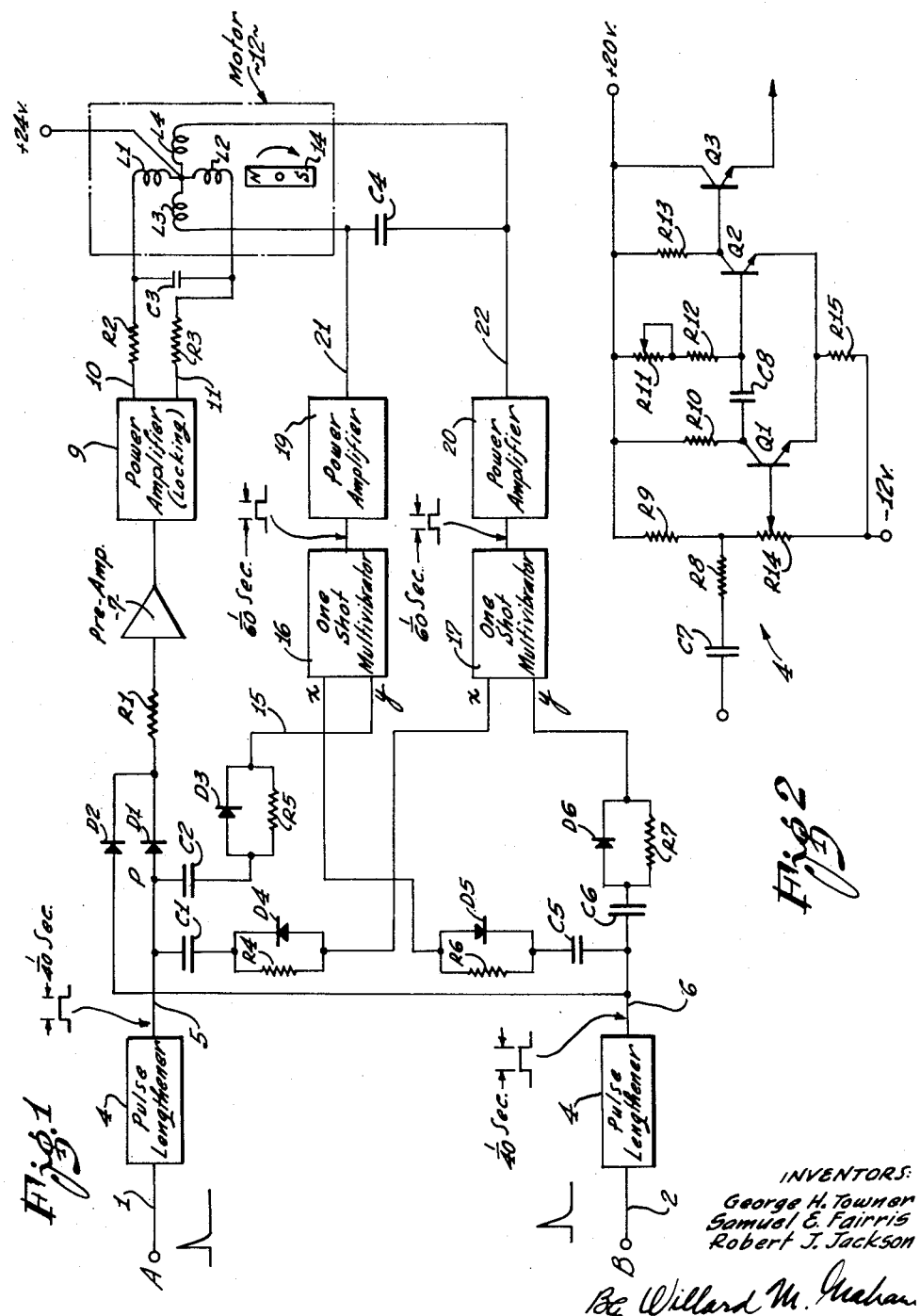

G. H. TOWNER ET AL 2,994,813

INCREMENTAL MOTOR SYSTEM

Filed Sept. 21, 1959

INVENTORS:
George H. Towner
Samuel E. Fairris
Robert J. Jackson

By Willard M. Graham
Agent,

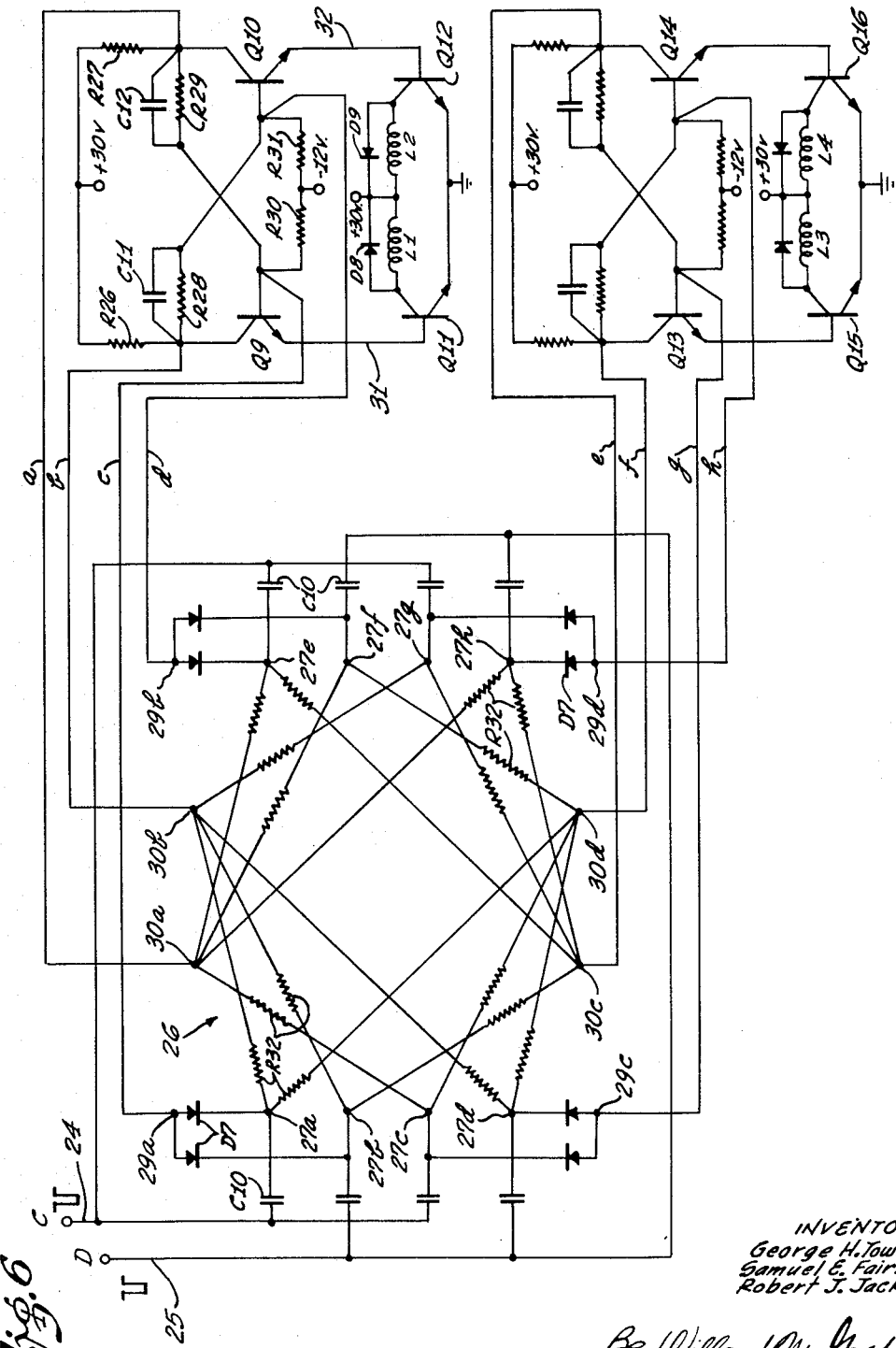

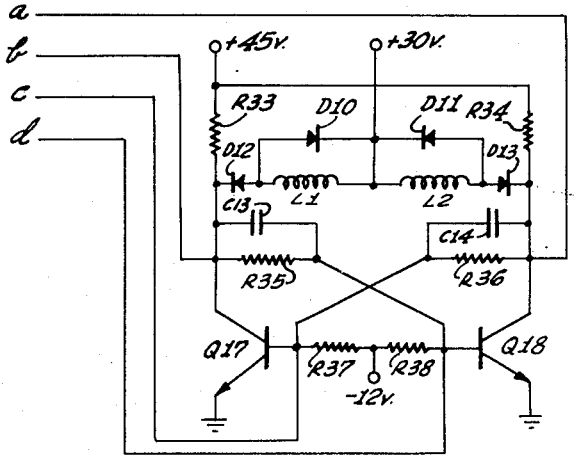
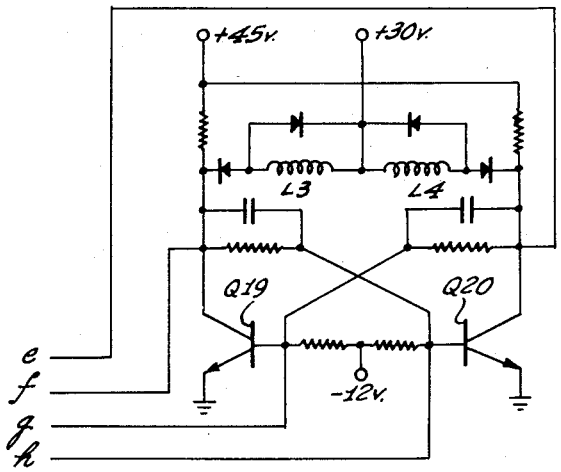
Fig. 7
INVENTORS:
George H. Towner
Samuel E. Fairris
Robert J. Jackson
By Willard M. Graham
Agent, United States Patent Office 2,994,813
Patented Aug. 1, 1961

2,994,813
INCREMENTAL MOTOR SYSTEM
George H. Towner, San Diego, Samuel E. Fairris, Long Beach, and Robert J. Jackson, Buena Park, Calif., assignors to Northrop Corporation, Beverly Hills, Calif., a corporation of California
Filed Sept. 21, 1959, Ser. No. 841,060
19 Claims. (Cl. 318—283)

The present invention relates to stepper motors, and more particularly, to a high speed all-electronic incremental motor system for rotating and positioning an output shaft in accordance with electrical input pulses.

Fast and highly accurate stepper motors have been in great demand for a considerable number of years, and many different types of devices have been proposed. However, the steppers and systems now in use still do not completely fulfill the many requirements existing. Particularly in navigation or guidance systems, for example, problems of speed, reliability over a great many cycles of operation, durability, and the like, are still present.

The objects of this invention are to provide a high speed electrically operated incremental motor system which is all electronic, having an electrical detent, with no contacts, relays, slip rings, or mechanical operating parts of any kind except the rotor shaft of a motor. By high speed is meant at least 100 pulses per second for low-acceleration operation.

Briefly our invention comprises a small two-phase electric motor of a type used in stepper systems, in combination with electronic switching circuitry having two input terminals to accept pulses for respectively opposite directions of rotation. The circuitry is preferably composed of all-electronic transistorized components, and maintains electric detent locking current in a certain motor coil or coils during the absence of input signal pulses. One embodiment of the present invention contains novel timing and phasing circuits for producing one full revolution of the motor shaft for each input pulse in either direction, and another embodiment contains a novel logic matrix and two bi-stable flip-flops for producing one-fourth revolution of the motor per pulse.

Other objects and advantages of our invention (in addition to compactness, economy, reliability, and the advantage of consisting of only one moving part and delicacy of operation) should be readily appreciated and suggest themselves as the invention becomes better understood by reference to the following detailed description and the accompanying illustrative drawings, wherein:

FIGURE 1 is a combination block and schematic diagram of an incremental motor system having one full turn per input pulse.

FIGURE 2 is a schematic diagram of a pulse lengthener in the device of FIGURE 1.

FIGURE 6 is a schematic diagram of an incremental motor circuit having one-fourth turn per input pulse.

FIGURE 7 is a schematic diagram of alternate flip-flop output circuits for the system of FIGURE 6.

Referring first to FIGURE 1 for the detailed description, a first input line 1 and a second input line 2 provide receiving connections for two input channels A and B respectively. Incoming pulses applied on input line 1 will cause clockwise operation and pulses applied on input line 2 are for counterclockwise operation. If short spiked input pulses are used, a pulse lengthener 4 is connected to each of the input lines to produce a preferably square pulse having a predetermined width. In the example to be described, this pulse width is 1/40 second.

As shown in FIGURE 2, the pulse lengthener 4 is a one-shot multivibrator composed of transistors Q1 and Q2 and having the proper R-C time constant to produce the desired pulse width. Since positive pulses are used, Q1 is normally off, biased to a non-conducting state, while Q2 is on. A positive input pulse will temporarily reverse these off-on states, thus producing a positive square output pulse to an emitter-follower stage Q3. Output from the stage Q3 is unchanged in sign and proceeds direct-connected to the rest of the circuitry in FIGURE 1.

Pulse lengthener output lines 5 and 6 are connected through channel isolating diodes D1 and D2, respectively, to the first end of a coupling resistor R1, the other end being connected to the input of a pre-amplifier 7. This may be any conventional amplifier, and may not be required in all cases. Its function is to provide approximately a 2-volt pulse to the following circuitry in this particular instance.

Figure 4:
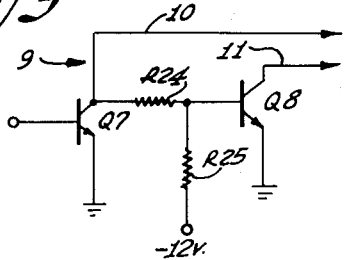
FIGURE 4 is a schematic diagram of the locking power amplifier.

The output of pre-amplifier 7 is connected to a locking power amplifier 9, further shown in FIGURE 4. Here, transistors Q7 and Q8 are connected in a monostable multivibrator trigger circuit wherein Q7 is normally essentially cut off and Q8 is fully conducting. A positive square pulse from the pre-amplifier 7 triggers Q7 on and Q8 off for the duration of the pulse, the circuit returning to normal with the end of the input pulse.

From the collectors of transistors Q7 and Q8, output wires 10 and 11 connect through respective filter resistors R2 and R3 to the opposite ends of one center-tapped motor coil in push-pull fashion, the respective halves of this coil being designated L1 and L2. A filter capacitor C3 is connected in parallel with coils L1 and L2.

As shown in FIGURE 1, stepper motor 12 is composed of two 90°-spaced center-tapped stator coils L1, L2 and L3, L4, with a mutual center tap connected to operating voltage, 24 volts for example. The rotor 14 is shown as a permanent magnet rotor, but could be of various other constructions instead, such as a wound rotor with D.C. current, a squirrel cage rotor with iron slotted at 0° and 180°, a salient pole iron rotor, a hysteresis rotor, or combinations of these. This type of stepper motor is used frequently in incremental systems, and can be of any suitable size and power desired. For instance, where light loads are concerned, a very small motor about ½ inch in diameter by 1½ inches in length and having an output torque of about ½ oz.-in. may be used. Motor operation in the present invention will be described later.

To continue the circuit description, from a point P at the input side of diode D1, a coupling capacitor C2 is connected to a parallel combination of resistor R5 and forward diode D3. From here, a conductor 15 leads to one input of a first one-shot multivibrator 16, this input being labelled y. A similar capacitor C1 is further connected at point P, in series with a parallel combination of resistor R4 and backward diode D4 to an x input of a second one-shot multivibrator 17.

From the second pulse lengthener output line 6, a coupling capacitor C5 in series with a parallel resistor R6 and backward diode D5 connects to the x input of first multivibrator 16. Also, a similar capacitor C6 in series with parallel resistor R7 and forward diode D6 connects to the y input of second multivibrator 17.

Figure 3:
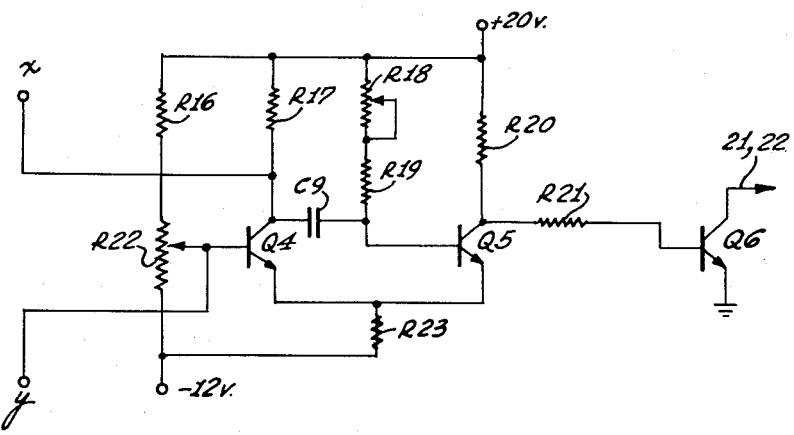
FIGURE 3 is a schematic diagram of a one-shot multivibrator and a power amplifier connected thereto as in the device of FIGURE 1.

Each one-shot multivibrator 16 and 17 feeds a respective power amplifier 19 and 20. These dual channels are identical, and a typical or preferred circuit is shown in FIGURE 3. Here, transistors Q4 and Q5 are in a one-shot circuit and transistor Q6 makes up the power amplifier. The x input connects to the collector of the first transistor Q4, and the y input connects to the base of the same Q4, in each multivibrator. In each case, the first transistor Q4 is biased normally off, and the second transistor Q5 is on. Bias potentiometer R22 is set so that Q4 is just cut off in the absence of an input signal, and timing potentiometer R18 is set to give the desired output pulse width.

Coupling capacitors C1, C2, C5, and C6 serve to differentiate and narrow down the square pulse applied to them, forming a spiked wave at the multivibrator inputs, and the one-shot multivibrators 16 and 17 are designed to have a square pulse output width of $\frac{1}{60}$ second in this instance. An output lead 21 from the first power amplifier 19 connects to a coil half L3 of the stepper motor 12, and another output lead 22 from second power amplifier 20 connects to coil half L4. A filter capacitor C4 is connected across the center-tapped coil L3, L4, to reduce the inductive kick when current through the coil is cut off.

Figure 5:
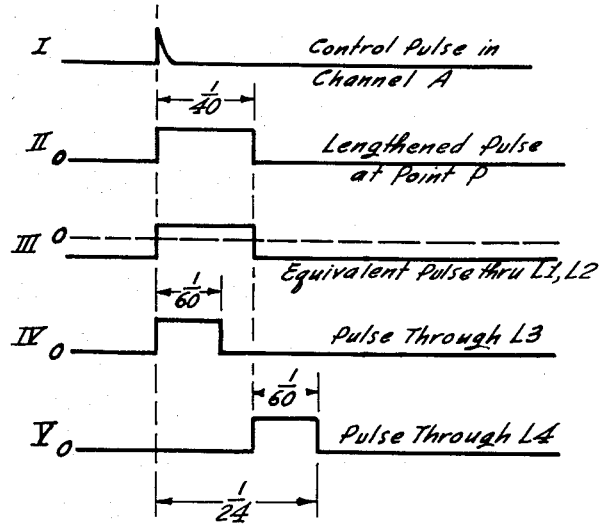
FIGURE 5 is a time-correlated set of waveforms showing the operation of the system of FIGURE 1.

For operation of the circuitry just described, reference is made to FIGURE 5 in conjunction with the previous drawings. Assume a control pulse is applied to channel A as shown in line I of FIGURE 5. Line II shows the resulting pulse after passing through the pulse lengthener 4. This will be amplified by locking power amplifier 9 without changing its width. Before the pulse is applied to locking amplifier 9, the second stage Q8 thereof is conducting heavily to cause motor locking current through L2. Negligible current is flowing in the first stage Q7 and L1. Thus, the motor 12 is at a standstill, locked in one particular position by means of this "electrical detent."

The $\frac{1}{40}$ second pulse at locking amplifier 9 causes stage Q7 to conduct and Q8 to be cut off, thereby simultaneously causing current flow in L1 and shutting off current in L2. It is important to note that this is equivalent in motor function to reversing a current through coil L1, L2, as shown in line III of FIGURE 5, where this motor pulse is in phase with the lengthened input pulse at point P.

In the meantime, the leading edge of the pulse at P also goes through capacitor C2 and forward diode D3 to the y input of first multivibrator 16 simultaneously with the pulse in line III. This immediately triggers the multivibrator and starts a $\frac{1}{60}$ second pulse at the output of the first power amplifier 19, thus resulting in the pulse shown in line IV through L3. This determines the clockwise direction of rotation of motor 12. Further, the positive leading edge of the pulse at P (line II) is blocked by backward diode D4 and does not appear at the x input of second multivibrator 17.

Next, the negative going trailing edge of the input pulse shown on line II does pass through diode D4 to the x input of second multivibrator 17, where it is applied through capacitor C9 to the base of conducting transistor Q5 to initiate a $\frac{1}{60}$ second positive pulse from this circuit, as shown on line V of FIGURE 5. The latter pulse appearing at the output of second power amplifier 20 obviously passes through the connected coil half L4. This insures that the motor rotor 14 continues turning in the clockwise direction, and it then stops at the same relative position one turn from its initial position. One incremental cycle in the clockwise direction has now been completed.

A positive pulse in channel B to this system will cause a similar full motor revolution except it will be counterclockwise. The internal waveforms will be the same as in FIGURE 5 with the pulses in lines IV and V interchanged, i.e., the pulse through L4 will precede the pulse through L3. The $\frac{1}{40}$ second pulse through locking amplifier 9 and coil L1, L2 will remain the same.

The action of the resistor-diode combinations such as R4 and D4 also prevents the negative going trailing edge of the first shorter $\frac{1}{60}$ second pulse from triggering the following $\frac{1}{60}$ second pulse. The latter pulse should be triggered only by the trailing edge of the longer $\frac{1}{40}$ second input pulse in line II of FIGURE 5.

A typical set of component types and electrical values for the embodiment just described is given in the following table, for example only:

| | |
|---|---|
| R1 | 1.2K |
| R2, R3 | 27 |
| R4, R5, R6, R7 | 1M |
| R8 | 18K |
| R9, R12, R14, R16, R22 | 10K |
| R10, R13, R17, R19 | 4.7K |
| R11, R18 | .5M |
| R15 | 510 |
| R20 | 390 |
| R21, R24 | 750 |
| R23 | 100 |
| R25 | 560 |
| C1, C2, C5, C6 | .01 mf. |
| C3, C4 | .68 mf. |
| C7 | .001 mf. |
| C8, C9 | 2 mf. |
| D1 thru D6 | 1N459 |
| Q1, Q2, Q4 | 2N118 |
| Q3, Q5 | 2N498 |
| Q6, Q7, Q8 | 2N389 |
| L1, L2, L3, L4 | 60 ohms D.C. |

Using the above circuit values, the stepper system actually built demonstrated that it would reverse operation at the rate of 15 pulses per second without malfunctioning, and would start from a standstill position at a rate of 30 pulses per second in either direction. Under low acceleration in one direction, it has a good torque output up to 60 pulses per second, and runs without miscount at low or zero acceleration up to 100 pulses per second. Of course the circuit may be varied by changing part values, to have different and higher performance figures, and the control pulse widths are changed to shorter pulses for the higher operating speeds. The pulse widths shown in FIGURE 5 are for an operating speed of 20 pulses per second.

Referring now to FIGURE 6, for a description of the one-fourth turn per pulse circuitry, a first input lead 24 for counterclockwise pulses and a second input lead 25 for clockwise pulses are provided for two input channels C and D, respectively. As shown, negative control pulses are to be supplied, and they can be very short. These input leads are connected to a resistor-diode matrix 26 having eight input junctions 27a through 27h, four output terminals 29a through 29d, and four gating terminals 30a through 30d. Four parallel-connected coupling capacitors C10 connect first input lead 24 to input junctions 27a, 27c, 27e, and 27g, respectively, and four additional capacitors C10 similarly connect second input lead 25 to input junctions 27b, 27d, 27f, and 27h.

Two diode rectifiers D7 are connected together at their anodes to output terminal 29a. Their cathodes are connected one each to input junctions 27a and 27b. A second pair of diode rectifiers D7 is connected with both their anodes at output terminal 29b and their cathodes respectively to input junctions 27e and 27f. Similarly, another diode pair is connected from input junctions 27c and 27d to output terminal 29c, and a fourth pair from input junctions 27g and 27h to output terminal 29d. Sixteen resistors R32 complete the matrix 26 as shown in FIGURE 6. It will be noted that a plurality of pairs of these matrix resistors R32 are connected in series between each of the upper gating terminals 30a and 30b and the two lower gating terminals 30c and 30d, with the center point of each of the eight pairs being connected respectively to one of the eight input junctions 27a through 27h. The center points of these resistor pairs will have a controlling voltage thereon during operation, to determine which one of the four output terminals will be operatively energized by each incoming control pulse. This will be more fully discussed later.

An upper bistable multivibrator, known as a flip-flop circuit, consisting of transistors Q9 and Q10 and associated resistive and capacitive components, is shown at the upper right-hand portion of FIGURE 6. Feedback lines *a* and *b* respectively connect the collectors of transistors Q10 and Q9 (whose potentials indicate the state of the flip-flop) to the upper gating terminals 30a and 30b, and two control lines *c* and *d* respectively connect the bases (trigger points) of transistors Q9 and Q10 to the two output terminals 29a and 29b. In a similar manner, a lower multivibrator flip-flop circuit Q13, Q14 is connected by feedback lines *e* and *f* to lower gating terminals 30c and 30d, and by two control lines *g* and *h* to output terminals 29c and 29d.

The upper flip-flop Q9, Q10 drives two power amplifiers Q11 and Q12 by means of connecting leads 31 and 32 respectively joining the emitters of Q9 and Q10 to the bases of Q11 and Q12. Thus the emitter current of the flip-flop stages provides the controlling base current for the grounded-emitter power amplifiers Q11 and Q12.

In the collector circuit of power amplifier Q11, the motor coil half L1 is the load element, and the other coil half L2 is the collector load in power amplifier Q12. L1 and L2 signify the same center-tapped stepper motor coil as used in the embodiment of FIGURE 1. The center tap is connected to a source of operating voltage, 30 volts for example, and two damping rectifier cells D8 and D9 are connected respectively across the coil halves L1 and L2 as shown, to protect their associated transistors from the inductive kick caused by cut off of current.

The lower flip-flop Q13, Q14 drives an identical power amplifier circuit Q15, Q16 containing the other motor coil halves L3 and L4.

In this embodiment, one of the coil halves L1, L2 and one of the coil halves L3, L4 are always energized, to determine the electrical detent position of the motor rotor (not shown in FIGURE 6). This rotor may be any of the structures mentioned in connection with the stepper motor of FIGURE 1. It is easily seen that there are four possible detents or stable incremental positions of the motor, depending on which two coil halves are energized, since the electrical fields of the two coils L1, L2 and L3, L4 are at right angles to each other in the stator of the motor, and there are four resultant magnetic fields corresponding to the four combinations of coil energization.

In operation, the resistor-diode matrix 26 functions the same as a four-position electromechanical switch having two ganged pole members. Each input pulse acts to effectively rotate this hypothetical switch one position, the direction depending upon which input channel C or D the pulse is applied. By discovering that such an electronic matrix may be made, we have thereby eliminated all mechanical elements, relays, sliding contacts, and the like, from previously known stepper motors.

The sequence of operation of the circuitry in FIGURE 6, in rotating the stepper motor one-fourth turn per input pulse, is illustrated by the following table.

| Pulse Number | Channel C (CCW) | | | | Channel D (CW) | | | |
|---|---|---|---|---|---|---|---|---|
| | L1 | L2 | L3 | L4 | L1 | L2 | L3 | L4 |
| (Start) 0 | On | Off | On | Off | On | Off | On | Off |
| 1 | Off | On | On | Off | On | Off | Off | On |
| 2 | Off | On | Off | On | Off | On | Off | On |
| 3 | On | Off | Off | On | Off | On | On | Off |
| (1 Rev.) 4 | On | Off | On | Off | On | Off | On | Off |

Actual operation of this circuit will now be described sufficiently to explain its manner of operation. Assume that the input pulses to channels C or D have an amplitude of at least 3 or 4 volts, negative as shown, and that the initial starting condition is with coil halves L1 and L3 energized. Thus, flip-flop stages Q9 and Q13 are conducting (on) and flip-flop stages Q10 and Q14 are not conducting (off), and these states are indicated by the respective collector voltages as is usual with flip-flops. In this condition, two gating terminals 30a and 30c have a relatively high potential, and the other two gating terminals 30b and 30d have a relatively low potential. Since the input pulses are negative, and the diode rectifiers D7 are connected with their cathodes toward the input side, an input pulse will not pass beyond an input junction through its corresponding rectifier D7 if the rectifier is blocked, i.e., has a cathode potential substantially more positive than its anode potential.

It can be seen that only two of the eight input junctions, 27a and 27d, are unblocked, i.e., have a low enough cathode potential relative to their anode potential to pass the input pulse. One of these input junctions 27a is in channel C and the other unblocked input junction 27d is in channel D. Thus the circuit will accept a pulse in either driving direction. Assuming a pulse occurs in channel C, it is transmitted only from input junction 27a along control line *c* to the base of transistor Q9, thus triggering the flip-flop to cut off Q9 and turn on Q10. This deenergizes motor coil half L1 and energizes L2, as shown after pulse number 1 in the foregoing table for channel C. Therefore, the stepper motor rotates one-fourth turn counterclockwise, as can be seen assuming the motor shaft to be coming out of the paper where the motor coils are illustrated in FIGURE 1.

A second pulse in channel C will now find only input junction 27c unblocked, so that it would be transmitted on control line *g* to reverse the state of flip-flop Q13, Q14, thus turning off L3 and turning on L4. The motor would then have turned incrementally another one-fourth revolution counterclockwise. Each following pulse in channel C continues to produce incremental rotation in a like manner. The resistor-capacitor circuits C10, R32 delay the actual diode voltage changes resulting from the bistable switching until after the end of each input signal pulse.

Operation at any time by a negative input pulse in channel D will produce one-fourth turn clockwise according to the sequence shown on the right-hand side of the aforesaid table for pulses in channel D. Of course, simultaneous pulses in channels C and D will not be presented to this system.

FIGURE 7 shows an alternate flip-flop and motor driving circuit for the system of FIGURE 6. This alternate circuit may be inserted at the lines *a* through *h*, as shown, in place of the transistor stages Q9 through Q16 of FIGURE 6. In cases where circumstances will allow, the flip-flops Q17, Q18 and Q19, Q20 of FIGURE 7 are composed of power transistors capable of driving the motor coils directly, thus eliminating a separate set of power amplifiers. Here, an extra pair of rectifier cells D12 and D13, for example, is inserted in series with the motor coils to prevent possible oscillation which might be caused by transformer action between opposite halves of the motor coils. The damping cells D10 and D11 serve the same purpose as their counterparts D8 and D9 in FIGURE 6.

A typical set of component types and electrical values for the embodiment in FIGURES 6 and 7 is given in the following table, for example only.

R26, R27 _____ 1K
R28, R29 _____ 3.9K
R30, R31 _____ 22K
R32 _____ 100K
R33, R34 _____ 450, 5W.
R35, R36 _____ 1.2K
R37, R38 _____ 6.8K
C10 thru C14 _____ .01 mf.
D7 _____ 1N459
D8 thru D13 _____ 1N253
Q9, Q10, Q13, Q14 _____ 2N498
Q11, Q12, Q15 thru Q20 _____ 2N389
L1, L2, L3, L4 _____ 60 ohms D.C.

Using the above circuit values, the stepper system of

FIGURE 6 showed exceptional power and speed. It has better torque output than the first embodiment. The system of FIGURE 6 starts from standstill on a stream of pulses having a frequency of 100 pulses per second, without missing a count, and counts successfully up to 750 pulses per second at constant speed. This present embodiment utilizes negative input pulses which can be as short as one micro-second, for example.

Thus it is seen that an incremental motor system fulfilling all of the stated objects has been provided, and in a simple and economical manner, using only standard components. Junction type NPN transistors are used throughout, with no special types necessary. Of course, the transistor types and models may be changed if desired. A most important feature is that it is all electronic in nature, thus eliminating wear, friction and poor electrical contacts from hampering the reliability and efficiency of the system.

While in order to comply with the statute, the invention has been described in language more or less specific as to structural features, it is to be understood that the invention is not limited to the specific features shown, but that the means and construction herein disclosed comprise a preferred form of several modes of putting the invention into effect, and the invention is therefore claimed in any of its forms or modifications within the legitimate and valid scope of the appended claims.

We claim:

1. An incremental motor system comprising a two-phase electric motor having two fields spaced at 90 degrees, said two fields being center-tapped, a voltage supply terminal connected to said center taps for supplying operating voltage thereto, a first pulse input channel for clockwise operation, a second pulse input channel for counterclockwise operation, electronic control circuitry between said input channels and said fields, said circuitry including electrical detent means for maintaining current in at least one of said fields in the absence of an input signal, and bi-directional electronic switching means for pulsing said fields to rotate said motor one incremental position in response to each applied input pulse.

2. Apparatus in accordance with claim 1 wherein said electrical detent means comprises multivibrator means having one side thereof normally in a conducting state, means connecting the outputs of said multivibrator means to the ends of said motor fields, and wherein said switching means consists only of resistor-diode network means directly connected between said input channels and the trigger points of said multivibrator means.

3. Apparatus in accordance with claim 2 wherein said means connecting the outputs of said multivibrator means to the ends of said motor fields comprise transistor power amplifiers, and wherein said multivibrator means comprise transistor circuits.

4. An incremental motor system comprising a first pulse input channel for clockwise operation, a second pulse input channel for counterclockwise operation, a monostable multivibrator having a double-ended, push-pull output, means connecting the input of said monostable multivibrator with both of said input channels, a first and a second one-shot multivibrator each having a single output and each having a double input responsive respectively and exclusively to positive and negative pulses, means connecting the first input of said first one-shot multivibrator and the second input of said second one-shot multivibrator to one of said input channels, means connecting the second input of said first one-shot and the first input of said second one-shot to the other said input channel, a two-phase electric motor having two 90-degree field windings, means connecting the double-ended output of said monostable multivibrator across the ends of one of said windings, means connecting the output of said first one-shot multivibrator to one end of the second said winding, and means connecting the output of said one-shot multivibrator to the other end of said second winding.

5. Apparatus in accordance with claim 4 wherein said connecting means between said input channels and said one-shot multivibrators include pulse differentiating means, and including time constant means in said one-shot multi-vibrators proportioned to make the output pulses therefrom shorter than the output pulses from said monostable multivibrator.

6. Apparatus in accordance with claim 4 including a forward rectifier between said first input channel and the second input of said first one-shot multivibrator, a forward rectifier between said second input channel and the second input of said second one-shot multivibrator, a backward rectifier between said first input channel and the first input of said second one-shot multivibrator, and a backward rectifier between said second input channel and the first input of said first one-shot multivibrator.

7. Apparatus in accordance with claim 4 wherein both said field windings have a common center-tapped junction, and means for connecting said center-tapped junction to a source of operating voltage, said field windings being the load elements of said means connecting the outputs of said multivibrators to said field windings.

8. An incremental motor system comprising a pulse input channel, a monostable multivibrator having a double-ended, push-pull output, means connecting the input of said monostable multivibrator with said input channel, a first one-shot multivibrator having a single output and an input adapted to be triggered by positive-going pulses only, a second one-shot multivibrator having a single output and an input adapted to be triggered by negative-going pulses only, means respectively connecting the inputs of said one-shot multivibrators to said input channel, said double-ended output of said monostable multivibrator adapted to be connected across one winding of a two-phase stepper motor, and said outputs of said one-shot multivibrators adapted to be respectively connected to the ends of the other winding of the two-phase stepper motor.

9. Apparatus in accordance with claim 8 including a two-phase electric motor having two 90-degree field windings, means connecting the double-ended output of said monostable multivibrator across the ends of one of said windings, means connecting the output of said first one-shot multivibrator to one end of the second said winding, and means connecting the output of said second one-shot multivibrator to the other end of said second winding.

10. Apparatus in accordance with claim 8 wherein said connecting means between said input channel and said one-shot multivibrators include pulse differentiating means, and including time constant means in said one-shot multivibrators having a value so that the output pulses therefrom are shorter than the output pulses from said monostable multivibrator.

11. An incremental motor system comprising a first pulse input channel for clockwise operation, a second pulse input channel for counterclockwise operation, a first and a second bistable multivibrator flip-flop circuit each having two trigger points, a two-phase electric motor having two 90-degree field windings, means connecting the output sides of said first flip-flop across one of said field windings, means connecting the output sides of said second flip-flop across the other said field winding, a resistor-diode matrix having four output terminals respectively coupled to the four trigger points of said two flip-flops, and means connecting said input channels to said matrix.

12. Apparatus in accordance with claim 11 wherein said matrix has four gating terminals, and means connecting said gating terminals respectively to the two output sides of each of said flip-flops.

13. Apparatus in accordance with claim 11 wherein said matrix has eight input junctions, and wherein said means connecting said input channels to said matrix comprises four capactiors between each of said two input channels and said eight input junctions, respectively.

14. Apparatus in accordance with claim 11 wherein said means connecting the output sides of said flip-flops to said field windings comprise four separate power amplifiers, said windings having a common center-tapped junction adapted to be connected to a source of operating voltage.

15. In an incremental motor system, a pair of two-transistor flip-flop circuits of the common-emitter type, four separate transistor power amplifiers, each power amplifier transistor having its emitter grounded and its base forming the sole connection to each respective emitter of the transistors in said flip-flop circuits, a two-phase electric motor having two 90-degree field windings, said field windings having a common center-tapped connection adapted to be supplied with motor operating voltage, the ends of said two windings being respectively connected to the collectors of said power amplifier transistors.

16. An incremental motor system comprising a pulse input channel, a first and a second two-stage bistable multivibrator flip-flop circuit each having two trigger points and two opposite state-indicating points, said two flip-flops adapted to control the respective fields of a two-phase stepper motor, a first pair of resistance elements connected in series between the first indicating point of said first flip-flop and the first indicating point of said second flip-flop, a second pair of resistance elements connected in series between said first flip-flop first indicating point and the second indicating point of said second flip-flop, a third pair of resistance elements connected in series between the second indicating point of said first flip-flop and said second flip-flop first indicating point, a fourth pair of resistance elements connected in series between said first flip-flop second indicating point and said second flip-flop second indicating point, the fourth center junctions of said four pairs of resistance elements forming four input junctions, four coupling elements connected at one end of each to said pulse input channel and respectively connected at the other ends to said input junctions, and four forward rectifier elements respectively connected between said input junctions and the four trigger points of said two flip-flops.

17. Apparatus in accordance with claim 16 including a two-phase electric motor having two 90-degree field windings, means connecting the two stages of said first flip-flop across one of said windings, and means connecting the two stages of said second flip-flop across the other said winding.

18. An incremental motor system comprising a first pulse input channel for clockwise operation, a second pulse input channel for counterclockwise operation, a first and a second two-stage bistable multivibrator flip-flop circuit each having two trigger points and two opposite state-indicating points, said two flip-flops adapted to control the respective fields of a two-phase stepper motor, a first and a second pair if resistance elements each connected in series between the first indicating point of said first flip-flop and the first indicating point of said second flip-flop, a third and a fourth pair of resistance elements each connected in series between said first flip-flop first indicating point and the second indicating point of said second flip-flop, a fifth and a sixth pair of resistance elements each connected in series between the second indicating point of said first flip-flop and said second flip-flop first indicating point, a seventh and an eighth pair of resistance elements each connected in series between said first flip-flop second indicating point and said second flip-flop second indicating point, the eight center junctions of said eight pairs of resistance elements forming eight input junctions, four coupling elements connected from said first input channel respectively to the input junctions of said first, third, fifth, and seventh pair of resistance elements, an additional four coupling elemens connected from said second input channel respectively to the input junctions of said second, fourth, sixth, and eighth pair of resistance elements, four forward rectifier elements respectively connected between said first, third, fifth, and seventh input junctions and the four trigger points of said two flip-flops, and four additional forward rectifier elements respectively connected between said second, fourth, sixth, and eighth input junctions and said four trigger points.

19. Apparatus in accordance with claim 18 including a two-phase electric motor having two 90-degree field windings, means connecting the two stages of said first flip-flop across one of said windings, and means connecting the two stages of said second flip-flop across the other said winding.

References Cited in the file of this patent

UNITED STATES PATENTS

| | | |
|---|---|---|
| 2,706,270 | Steele | Apr. 12, 1955 |
| 2,725,512 | Padron | Nov. 29, 1955 |
| 2,774,026 | Towner | Dec. 11, 1956 |
| 2,809,335 | Welch | Oct. 8, 1957 |
| 2,922,095 | Hesse et al. | Jan. 19, 1960 |